US012730997B2

(12) United States Patent
Brandt et al.

(10) Patent No.: US 12,730,997 B2
(45) Date of Patent: Sep. 8, 2026

(54) DEVICES, SYSTEMS, AND METHODS FOR IMPROVING THROUGHPUT OF SCANNERS CAPTURING IMAGES OF ITEMS POTENTIALLY HAVING MULTIPLE LABELS

(71) Applicant: Datalogic IP Tech S.r.l., Lippo di Calderara di Reno (IT)

(72) Inventors: Jonathan R. Brandt, Eugene, OR (US); Michele Benedetti, Lippo di Calderara di Reno (IT); Vittorio Rago, Lippo di Calderara di Reno (IT)

(73) Assignee: Datalogic IP Tech S.r.l., Lippo di Calderara di Reno (IT)

( * ) Notice: Subject to any disclaimer, the term of this patent is extended or adjusted under 35 U.S.C. 154(b) by 0 days.

(21) Appl. No.: 19/199,067

(22) Filed: May 5, 2025

(65) Prior Publication Data

US 2025/0342332 A1 Nov. 6, 2025

Related U.S. Application Data

(60) Provisional application No. 63/642,524, filed on May 3, 2024.

(51) Int. Cl.
*G06K 7/14* (2006.01)

(52) U.S. Cl.
CPC ......... *G06K 7/1439* (2013.01); *G06K 7/1413* (2013.01); *G06K 7/1417* (2013.01)

(58) Field of Classification Search
CPC ... G06K 7/1439; G06K 7/1413; G06K 7/1417
See application file for complete search history.

(56) References Cited

U.S. PATENT DOCUMENTS

| | | | | |
|---|---|---|---|---|
| 11,048,301 | B2 | 6/2021 | Curti et al. | |
| 11,227,173 | B2 | 1/2022 | Canini et al. | |
| 11,416,697 | B2 | 8/2022 | Stefanini et al. | |
| 11,954,556 | B1 | 4/2024 | Fracassi | |
| 2020/0257869 | A1* | 8/2020 | Powell ............ | G06K 19/06028 |
| 2023/0206205 | A1 | 6/2023 | Howard et al. | |

* cited by examiner

*Primary Examiner* — Matthew Mikels
(74) *Attorney, Agent, or Firm* — Stoel Rives LLP

(57) ABSTRACT

An image-based optical scanner utilizes methods to improve throughput when decoding items in an environment when items may have only one label, while some items may have multiple labels such both 1D and 2D barcodes. The scanner may include maintaining and updating a local GTIN database during a learning phase, which may be based on its own data or data shared with other devices such as remote servers and/or other scanners. The scanner may also enhance decoding algorithms based on localization information to speed up the process of decoding 2D labels after a 1D label has been decoded.

20 Claims, 4 Drawing Sheets

DEVICES, SYSTEMS, AND METHODS FOR IMPROVING THROUGHPUT OF SCANNERS CAPTURING IMAGES OF ITEMS POTENTIALLY HAVING MULTIPLE LABELS

RELATED APPLICATIONS

This application claims the benefit of U.S. Provisional Application No. 63/642,524, filed May 3, 2024, and entitled "Devices, Systems, and Methods for Improving Throughput of Scanners Capturing Images of Items Potentially Having Multiple Labels," the disclosure of which is incorporated by reference herein in its entirety.

CROSS-REFERENCE TO RELATED APPLICATIONS

This application is related to U.S. Provisional Application No. 63/642,528, filed May 3, 2024, and entitled "Devices, Systems, and Methods for Providing GS1 Data Driven Actions in a Label Scanner," and its corresponding non-provisional application filed on the same day of the present application. The disclosure of each of these applications is incorporated by reference herein in their entirety.

TECHNICAL FIELD

The present disclosure generally relates to optical scanning devices and, more particularly, to capturing and processing of images containing subject matter of interest such as of items having multiple labels disposed thereon, such as machine-readable symbols or patterns.

BACKGROUND

Image-based optical scanning includes a diverse range of applications such as reading of machine-readable symbols (e.g., one-dimensional symbols, 2-dimensional symbols), optical character recognition, object detection or recognition, and the like. In general, such systems work by capturing a digital image of a subject using a camera with an image sensor, and computationally processing the captured image to autonomously detect, recognize, or read the subject. The output generally includes data represented by, or describing, the subject. For example, in the case of reading a 1D or 2D symbol, the output may be a number or an alphanumeric string represented by that symbol. Likewise, in the case of recognizing a printed or hand-written character or set of characters, the output may be a textual representation of that character or set; and in the case of object recognition, the output may be a classification result (e.g., a label) describing the object. Optical scanners offer the versatility of being able to capture many different types of symbols and at different distances from the reader. State-of-the-art optical scanners use multiple cameras with different fields of view to capture multiple images of the subject, and use image processing techniques to determine the best image for symbol reading.

GS1 Digital Link is an important part of the retail industry's global migration to 2D barcodes where the vision is that each product will have a single multipurpose 2D barcode that can be used at the retail point-of-sale, and to access digital content such as certifications, instructions for use, product information, traceability information and more. During a transitional period, some products may include a set of labels being present including, for example, a 1D label (e.g., linear barcode) and a 2D label (e.g., QR code).

Once customers start using the 2D label information of the GS1 Digital Link label set, it is expected that they will want the 2D label information if it is printed on an item. Some items will only have a linear label and some items will have both the linear and 2D labels and/or other label schemes (e.g., digital watermarks). After the GS1 Digital Link transitional period time is over, it is expected that items will have only a linear label or a 2D label with or some other label scheme. The inventors have contemplated solutions that address problems that may be encountered during this transitional period, which may improve operation of the scanner or the scanning process, such as impacting the throughput of the scanner, decoding speed and/or accuracy, power consumption, etc.

BRIEF SUMMARY

A scanning device comprises an imager configured to capture images of items passing through a field of view, a memory having a local GTIN database stored thereon that associates items that have a 2D label based on a GTIN of the item or items that do not have a 2D label, and a processor operably coupled to the imager and the memory. The processor is configured to: delay reporting decoding a 1D label and attempting to decode a 2D label responsive the GTIN database indicating that a 2D label is associated with the item; report decoding the 1D label and skipping the attempt to decode a 2D label responsive the GTIN database indicating that a 2D label is not associated with the item; and update the local GTIN database during a learning phase.

DETAILED DESCRIPTION

Figure 1:
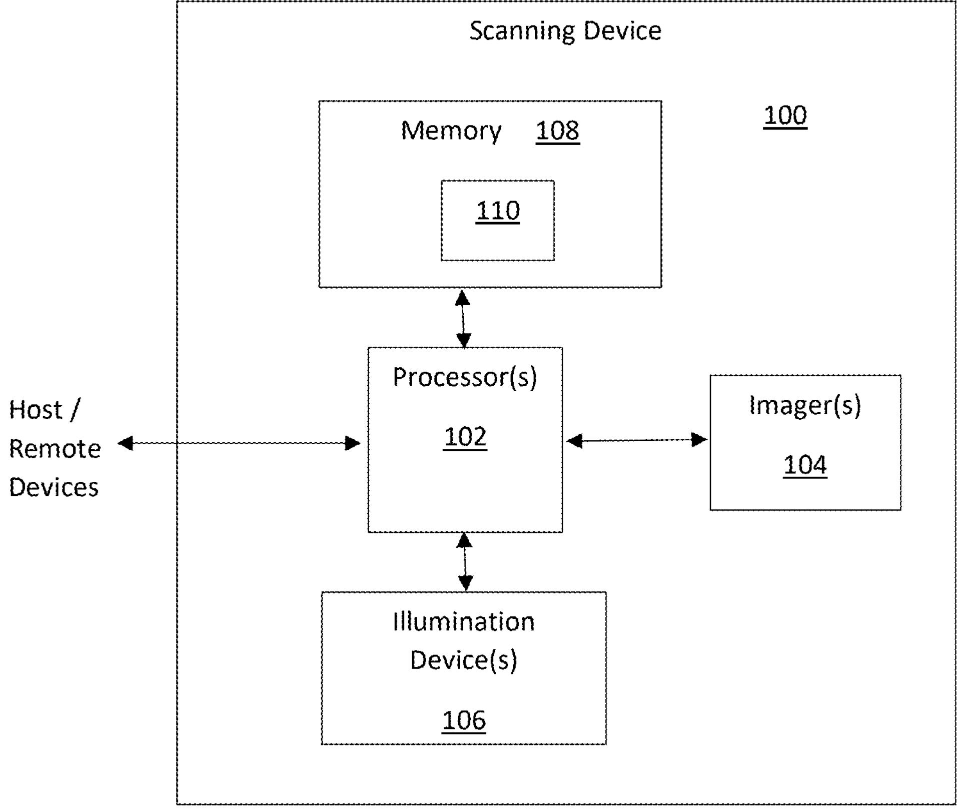
FIG. 1 is a simplified schematic block diagram of a scanning device according to an embodiment of the disclosure.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operatively connected with each other, such as connected through a direct connection or through an indirect connection (e.g., via another structure or component).

As used herein, terms such as "scanning device," "scanner," "reader," may be used interchangeably for devices that are configured to capture images of items and recognize (i.e., read) machine-readable symbols such as barcodes (1D, 2D, etc.) or other related symbologies.

Embodiments of the disclosure may be incorporated into a variety of scanning devices having different form factors and configurations, such as fixed retail scanners (e.g., single plane scanners, bi-optic scanners, presentation scanners, etc.), handheld scanners, mobile computers, wearable scanners, industrial scanners, scan engines, etc. that are used in a variety of applications and settings. Examples of various configurations and components of such scanners are described in U.S. patent Ser. No. 18/071,594, filed Nov. 29, 2022, and entitled "FIXED RETAIL SCANNER WITH MULTI-PORT NETWORK SWITCH AND RELATED METHODS," U.S. Pat. No. 11,048,301, issued Jun. 29, 2021, entitled "MULTIPLE DISPLAYS MANAGEMENT IN BARCODE READING APPLICATIONS," U.S. Pat. No. 11,227,173, issued Jan. 18, 2022, entitled "VIRTUAL-FRAME PREPROCESSING FOR OPTICAL SCANNING," U.S. Pat. No. 11,416,697, issued Aug. 16, 2022, entitled "INDUCTIVE AIMING TRIGGER," and U.S. Pat. No. 11,954,556, issued Apr. 9, 2024, entitled "WEARABLE GLOVE WITH AUTO RECOGNITION," the disclosure of each of which is incorporated by reference in their entirety. Different components, configurations, and form factors of various scanning devices are also contemplated including combinations of those described herein.

During the transitional period of GS1 Digital Link, scanning devices may not know how may labels are part of the label set on an item. There may be one label or multiple labels. Typically, decoding algorithms of scanners decode 1D labels before 2D labels because the decode process for 1D labels requires less processing. If the scanner decodes the 1D label first, the scanner may then wait to locate and decode the 2D label before providing a good-read indication and transmitting a result to the host. If there is no 2D label on the item, this may result in a slower throughput because the scanner waits for the 2D label before providing a good-read indication and reporting the 1D label. Thus, items with only a 1D label typically have a delay in the good-read indication and transmission under conventional approaches because the scanner may be looking for the 2D label for a time-out period. An advantage of embodiments of the disclosure may include increasing the speed of the scanner reporting label information to a host (e.g., POS system) for items that only have a 1D label. Because many items will only have a 1D label, this may result in a significant amount of delay in the scanning process at point-of-sale systems.

Embodiments of the disclosure may include the scanner being configured to record and/or learn which items have a 2D label using the GTIN of the item as a key in a database. In some embodiments, the scanner records and/or learns which items do not have a 2D label and uses the GTIN of the item as a key in a database. If a scanner first reads the 1D label of a label set, the scanner may be configured to query the database of GTINs and will produce a good-read indication and transmit the 1D label if a 2D label is not expected for the item. If a matching 2D label is expected, the scanner may be configured to continue looking for the 2D label and will give a good-read indications and transmit the label if found. If a 2D label is not found for a configurable timeout, a good-read indication is given and the 1D label is transmitted.

FIG. 1 is a simplified schematic block diagram of a scanning device 100 according to an embodiment of the disclosure. The scanning device 100 (also referred to as a "scanner") includes one or more processors 102 operably coupled to one or more imagers 104, illumination devices 106, and memory 108. Memory 108 may be a separate memory device, embedded memory (e.g., embedded with the system processor) or both (e.g., distributed memory) that may include volatile and/or non-volatile memory to store instructions and/or data in the execution of methods described herein. The processor 102 may be configured to control operation (e.g., trigger, synchronization, etc.) of the imagers 104 and illumination devices 106. The processor 102 may also be configured to execute decoding algorithms configured to decode machine-readable symbols (i.e., labels) located within the images captured by the imagers 104. The processor 102 may include one processor or multiple processors configured to perform different tasks of the system. The memory 108 may include a GTIN database 110 that may include associations related to the multiple labels that may be present on various items. The GTIN database 110 may be dynamically updated based on updates provided by the scanning device 100 itself, by a host device (e.g., POS system, remote service), by other scanners, or any combination thereof.

The scanning device 100 may be configured to learn and/or record GTINs of items that have a 2D label. For example, over time the scanning device may recognize that a particular item having a 1D label also includes a 2D label disposed thereon. Thus, the GTIN database 110 may be updated to indicate the joint presence of the 2D label for that item. In some embodiments, the scanning device 100 may be configured to learn and/or record GTINs of items that do not have a 2D label. For example, over time the scanning device may recognize that a particular item having a 1D label does not include a 2D label disposed thereon. Thus, the GTIN database 110 may be updated to indicate the lack of presence of a 2D label for that item. During this self-learning mode, the scanning device 100 may track the relationships between the 1D label and the presence (or absence) of a 2D label over a predetermined number of decodes before updating the GTIN database 110. Doing so may reduce the number of incorrect associations in the GTIN database 100.

The scanning device 100 may be configured such that the processor 102 may query the GTIN database 110 to determine if a 2D label is expected for an item. The scanning device 102 may check a learning mode to determine what to do when a 1D label is decoded from an item with a GTIN that is not in the GTIN database 110. In a 2D Label Required mode, the scanning device 100 may require the 2D label if the GTIN database 110 indicates the GTIN of a 1D label for an item that should also have a 2D label. In some embodiments, the scanning device 100 may learn that a product item no longer has a 2D label causing the scanning device 100 to remove the 2D GTIN from the GTIN database 110.

Some example embodiments are described below. For these examples, the following definitions are used:

GTIN—14-digit Global trade identification number that is specified by the GS1 organization.

Product_Item—An item that is identified by a label that contains GTIN information. Typically, these items are retail products but are not limited to this.

GS1_1D_Label—Any 1D label specified by the GS1 organization that can carry a GTIN or a subset of the GTIN number set. Some 1D labels may be able to carry additional information about the product item. Some example label symbologies are UPCA, EAN13, UPCE, EAN8, GS1-Code 128, and Databar.

GS1_2D_Label—Any 2D label specified by the GS1 organization that can carry a GTIN and possibly additional information about the product item. Some example label symbologies are Datamatrix and QR Code.

GS1_DL_Label_Set—A set of labels for a Product Item that may include a GS1_1D_Label, GS1_2D_Label, and Digimarc labels. All labels share the same GTIN representation.

GTIN_db—database that stores GTIN numbers.

Wait_For_2D_Timer—timer used to wait for a 2D label that matches the GTIN of a 1D label that has been decoded.

1D_GTIN—The GTIN for a GS1_DL_Label_Set that only has a GS1_1D_Label in the set.

2D_GTIN—The GTIN for a GS1_DL_Label_Set that has a GS1_1D_Label and GS1_2D_Label in the set.

Double_Read_Protection—mechanism that prevents a label of a specific GS1_DL_Label_Set from being transmitted after the first transmission of a label from the set.

GS1_DL_Learning_Mode—When enabled, GS1_1D_Labels that do not have a GTIN in the GTIN_db cause the algorithm to wait for a 2D label. When disabled, GS1_1D_Labels that do not have a GTIN in the GTIN_db are sent immediately.

GS1_2D_Label_Required Mode—When enabled a GS1_2D_Label is required when the GTIN_db has a 2D_GTIN that matches the GTIN of a GS1_1D_Label.

2D_GTIN_Removal_Reads—The number of Double_Read_Protection events a GS1_1D_Label must be part of without a corresponding GS1_2D_Label to cause the 2D_GTIN is removed from the GTIN_db.

2D_GTIN_Missed_Reads—current number of reads that have not found a 2D label that corresponds with a 2D_GTIN in the GTIN_db.

In some embodiments, the GTIN_db stores 2D_GTINs. The GTIN_db optionally stores 1D_GTINs. 2D_GTINs in the GTIN_db may be used by the scanner to wait for a GS1_2D_Label if a GS1_1D_Label is seen first and the GS1_1D_Label has a GTIN that matches a 2D_GTIN in the GTIN_db. 1D_GTINs in the GTIN_db may be used by the scanner to immediately indicate and transmit a GS1_1D_Label if the GS1_1D_Label's GTIN matches a 1D_GTIN in the GTIN_db. The Wait_For_2D_Timer may be used to wait for a configurable time for a GS1_2D_Label if a GS1_1D_Label is seen first. If the timer expires, the scanner will indicate and transmit the GS1_1D_Label unless GS1_2D_Label_Required is enabled.

GS1_DL_Learning_Mode may be used to determine what to do with GS1_1D_Labels that have a GTIN that is not in the GTIN_db. If the mode is enabled, the scanner will wait for a GS1_2D_Label. If the mode is disabled, the scanner will indicate and transmit the GS1_1D_Label immediately. GS1_2D_Label_Required mode may cause the scanner to require a GS1_2D_Label decode if a GS1_1D_Label is decoded and its GTIN is a 2D_GTIN in the GTIN_db. 2D_GTIN_Removal_Reads is used to learn which 2D_GTINs need to be removed from the GTIN_db. A 2D_GTIN is removed when the GTIN is seen in a GS1_1D_Label for the configurable number of reads without seeing a GS1_2D_Label with that GTIN. The scanner may be configured to learn which GTINs have a GS1_2D_Label by adding the corresponding GTIN as a 2D_GTIN to the GTIN_db whenever a GS1_2D_Label is seen. The scanner may learn which GTINs do not have a GS1_2D_Label by adding the corresponding GTIN as a 1D_GTIN to the GTIN_db whenever a GS1_2D_Label is not seen by the time the Wait_For_2D_Timer expires and the GTIN does not already exist as a 2D_GTIN in the GTIN_db.

The following logic examples are related to decoding labels for a GS1_DL_Label_Set, which may be under the assumption that a mechanism for Double_Read_Protection is in place.

Example #1—Learn 2D_GTIN of 2D Labels

One benefit of this example may be that it uses less memory because the scanner only stores the GTINs of GS1_2D_Labels that it has seen. A potential drawback is that it may assume all GTINs that do not exist in the GTIN database do not have an associated GS1_2D_Label and does not wait for the GS1_2D_Label even if it has never seen the GTIN before. Until the scanner sees a GS1_2D_Label for a GTIN, the GS1_2D_Label may be missed and not sent to the host.

The following is an example of pseudocode for the decoding process related to example 1:

```
IF a GS1__2D__Label is decoded
  If a Wait__For__2D__Timer is running for the GTIN of this GS1__2D__Label,
  stop the timer and discard the association between GS1__ID__Label and the
  timer.
  If the GS1__2D__Label is not stopped by Double__Read__Protection, provide
  indication of the decoded label and transmit the GS1__2D__Label to host
  IF the GTIN of the GS1__2D__Label does not exist in the GTIN__db as a
  2D__GTIN
    Add the GTIN as a 2D__GTIN to learn that the GTIN has a
    GS1__2D__Label.
  ELSE - the GTIN exists as a 2D__GTIN
    Clear the number of 2D__GTIN__Missed__Reads for the 2D__GTIN
  ENDIF
```

-continued

```
ELSE IF a GS1_1D_Label is decoded and it is not stopped by
Double_Read_Protection
  IF the GTIN_db contains a 2D_GTIN that matches the GTIN of the
  GS1_1D_Label
    IF a Wait_For_2D_Timer already exists that is associated with an
    identical GS1_1D_Label to the new GS1_ID_Label
      Discard the new GS1_ID_Label
    ELSE
      Start Wait_For_2D_Timer with the time to wait for the
      decoding of a GS1_2D_Label of the same
      GS1_DL_Label_Set.
      Associate the GS1_1D_Label with the
      Wait_For_2D_Timer
    ENDIF
  ELSE
    Provide indication of the decoded label and transmit to host.
  ENDIF
ENDIF
```

The following is an example of pseudocode for the timer process related to example 1:

```
Upon expiration of a Wait_For_2D_Timer
  IF the GS1_1D_Label associated with the Wait_For_2D_Timer is not
  stopped by Double_Read_Protection and GS1_2D_Label_Required is
  disabled
    Provide indication of the decoded label and transmit to host.
  ELSE
    Discard the GS1_1D_Label
  ENDIF
  Increment the number of 2D_GTIN_Missed_Reads against the 2D_GTIN
  in the GTIN_db
  IF the number of 2D_GTIN_Missed_Reads for the 2D_GTIN is greater
  than or equal to 2D_GTIN_Removal_Reads
    Remove the 2D_GTIN from the GTIN_db to learn the
    GS1_2D_Label is no longer part of the GS1_DL_Label_Set
  ENDIF
```

Example #2—Learn 1D_GTINs and 2D_GTINs

One potential benefit of this example is that it may be more likely to find the GS1_2D_Label when it exists and transmit GS1_1D_Label quickly when a GS1_2D_Label does not exist. A potential drawback is that this logic example may use more memory because it stores information about all GTINs that are seen.

The following is an example of pseudocode for the decoding process related to example 2:

```
IF a GS1_2D_Label is decoded
  If a Wait_For_2D_Timer is running for the GTIN of this GS1_2D_Label,
  stop the timer and discard the association between the saved
  GS1_1D_Label and the timer.
  If the GS1_2D_Label is not stopped by Double_Read_Protection, provide
  indication of the decoded label and transmit to host
  IF the GTIN of the GS1_2D_Label does not exist in the GTIN_db as a
  2D_GTIN
    Add the GTIN as a 2D_GTIN to learn that the GTIN has a
    GS1_2D_Label.
  ELSE - the GTIN exists as a 2D_GTIN
    Clear the number of 2D_GTIN_Missed_Reads for the 2D_GTIN
  ENDIF
ELSE IF a GS1_1D_Label is decoded
  IF the GTIN_db contains a 1D_GTIN that matches the GTIN of the
  GS1_1D_Label
    If the GS1_1D_Label is not stopped by Double_Read_Protection,
    provide indication of the decoded label and transmit to host.
  ELSE IF the GTIN_db contains a 2D_GTIN that matches the GTIN of the
  GS1_1D_Label
    IF a Wait_For_2D_Timer already exists that is associated with an
    identical GS1_1D_Label to the new GS1_ID_Label
      Discard the new GS1_1D_Label
    ELSE
      Start Wait_For_2D_Timer for the time to wait for the
      decoding of a GS1_2D_Label from the same
      GS1_DL_Label_Set.
```

-continued

```
        Associate the GS1_1D_Label with the
        Wait_For_2D_Timer
    ENDIF
  ELSE the GTIN_db does not have a GTIN that matches the
  GS1_1D_Label
    IF GS1_DL_Learning_Mode is enabled
        Start Wait_For_2D_Timer for the time to wait for the
        decoding of a GS1_2D_Label from the same
        GS1_DL_Label_Set.
        Associate the GS1_1D_Label with the
        Wait_For_2D_Timer
    ELSE GS1_DL_Learning_Mode is disabled
        If the GS1_1D_Label is not stopped by
        Double_Read_Protection, provide indication of the
        decoded label and transmit to host.
    ENDIF
  ENDIF
ENDIF
```

The following is an example of pseudocode for the timer process related to example 2:

```
    Upon expiration of the Wait_For_2D_Timer
        IF the GS1_1D_Label associated with the Wait_For_2D_Timer is not
        stopped by Double_Read_Protection and GS1_2D_Label_Required is
        disabled
            Provide indication of the decoded label and transmit to host.
        ELSE
            Discard the GS1_1D_Label
        ENDIF
        IF the GTIN of the GS1_1D_Label does not exist in the GTIN_db as a
        2D_GTIN
            Add the GTIN as a 1D_GTIN to the GTIN_db to learn that a
            GS1_2D_Label does not exist for the GTIN
        ELSE - a 2D_GTIN exists for the GTIN
            Increment the number of 2D_GTIN_Missed_Reads against the
            2D_GTIN in the GTIN_db
            IF the number of 2D_GTIN_Missed_Reads for the 2D_GTIN is
            greater than or equal to 2D_GTIN_Removal_Reads
                Remove the 2D_GTIN from the GTIN_db to learn the
                GS1_2D_Label is no longer part of the
                GS1_DL_Label_Set
                Add the GTIN as a 1D_GTIN to the GTIN_db
            ENDIF
        ENDIF
```

In some embodiments, the size of the GTIN database may be limited, such as by limiting the number of stored GTINs. When new GTINs are added to a full GTIN_db, the GTIN with the least recent access may be discarded to make room for the new GTIN. In some embodiments, the timer value for the Wait_For_2D_Timer may be configurable by the user. In some embodiments, this delay may be a fixed value. In some embodiments, this delay may be flexible (e.g., dynamically adjustable) value. For example, if the scanner detects a finder pattern of a 2D label, the decoding process may add extra time to the delay time in order to complete the decoding of the 2D label. If no finder pattern is detected, then the non-adjusted delay may be used after which the scanner will beep and transmit the 1D result after expiration of the timeout period without decoding of a 2D label.

When removing 2D_GTINs from GTIN_db, the algorithm above includes a learning method to remove 2D_GTINs from the GTIN_db. In an alternative embodiment, the method may include providing an action programming label to users that can be used to remove a 2D_GTIN from the GTIN_db by scanning the action programming label and then scanning the GS1_1D_Label or GS1_2D_Label that contains the desired 2D_GTIN that is to be removed.

Additional embodiments may include the scanning device 100 being configured to export the data from the GTIN database 110 that has been learned by the scanning device 100. The exported GTIN database data may be provided to another external system (e.g., remote server, in-store server, POS system, etc.) that may use it to update a central database of GTIN information. In some embodiments, the exported data may be provided to other scanning devices on a common network, such as a store network.

In some embodiments, the scanning device 100 may also be configured to import GTIN database data from other devices. For example, the imported GTIN Database data may provided to the scanning device 100 by an external system (e.g., remote server, in-store server, POS system, etc.). The external system can maintain a GTIN Database that is used throughout their business and/or provided and sold to other businesses. In some embodiments, the imported data may be received from other scanning devices on a common network, such as a store network.

The external system can provide accurate GTIN database data to a group of scanners so that scanners may have updated information about whether an item is expected to have a 2D label or only a 1D label. The scanner can provide GTIN database data updates to an external system about the existence of 2D labels on items that have been seen.

Exporting the GTIN_db data may be achieved from one or more different formats. Non-limiting examples of such formats may include CSV (comma separated value) file or stream of data, XML (extensible markup language) file or stream of data, JSON (JavaScript Object Notation) file or stream of data, binary database file or stream of data, data for individual GTINs, among other contemplated formats that would be recognized by those skilled in the art.

Exporting the GTIN_db data may be transmitted through one or more different channels. Non-limiting examples of such channels may include a host RS232 cable, a host USB cable, Ethernet connection, a service port cable, an SD or micro-SD card, WiFi, Bluetooth Radio frequency protocol, other Radio Frequency channels and protocols, among other contemplated channels and protocols that would be recognized by those skilled in the art. The scanner may therefore include the hardware and software to support one or more channels to export such data. The scanner software may also be configured to convert its internal GTIN_db data to the format required for the export. The exported data may include the complete GTIN_db data or a subset of the GTIN_db data. In some embodiments, the subset may include only the change to the GTIN_db data or the accumulated set of changes to the GTIN_db data since a prior export of such data. In some embodiments, the scanner may provide configurable features to allow a user to select a preferred export format, channel, and what set of the GTIN_db to export.

The export of the GTIN_db data may be initiated by one or more events. Non-limiting examples of such events may include a change to the GTIN_db, a predetermined number of accumulated changes to the GTIN_db, a periodic time period, detection of a programming label, a specific button press or button press sequence on the scanner, power-up of the scanner, a reset of the scanner, reception of a command to the scanner over one of the communication channels (e.g., from a remote server, the POS system, another scanner, etc.). Other contemplated event triggers for export of changes to the GTIN_db are included within embodiments of the disclosure as would be recognized by those skilled in the art.

The import of the GTIN database data may be achieved from one or more different formats. Non-limiting examples of such formats may include CSV (comma separated value) file or stream of data, XML (extensible markup language) file or stream of data, JSON (JavaScript Object Notation) file or stream of data, binary database file or stream of data, data for individual GTINs, among other contemplated formats that would be recognized by those skilled in the art.

Importing the GTIN_db data may be received through one or more different channels. Non-limiting examples of such channels may include a host RS232 cable, a host USB cable, Ethernet connection, a service port cable, an SD or micro-SD card, WiFi, Bluetooth Radio frequency protocol, other Radio Frequency channels and protocols, among other contemplated channels and protocols that would be recognized by those skilled in the art. The scanner may therefore include the hardware and software to support one or more channels to import such data. The scanner software may also be configured to convert the import format of the data to the format of its internal GTIN_db data. The imported data may include a complete replacement of its GTIN_db data or a replacement for a subset of the GTIN_db data. In some embodiments, the subset may include only the change to the GTIN_db data or the accumulated set of changes to the GTIN_db data since a prior import of such data. In some embodiments, the scanner may provide configurable features to allow a user to select a preferred import format, channel, and what set of the GTIN_db will be imported.

The import of the GTIN_db data may be initiated by one or more events. Non-limiting examples of such events may include a change to the GTIN_db at an external device or system, a predetermined number of accumulated changes to the GTIN_db at an external device or system, a periodic time period, detection of a programming label to initiate an import request, a specific button press or button press sequence on the scanner to initiate an import request, power-up of the scanner to initiate an import request, a reset of the scanner to initiate an import request, etc. Other contemplated event triggers for the import of changes to the GTIN_db are included within embodiments of the disclosure as would be recognized by those skilled in the art.

In some embodiments, scanning devices may communicate with each other directly and/or indirectly (e.g., through an external database) to share information in their GTIN databases. As a result, the scanning devices may be configured to manage their GTIN database without changes to those of a host system. This ability to share such GTIN database changes may assist the GTIN database to learn and adapt quicker in a way that may benefit a group of scanning devices in an equal way through a shared GTIN database.

The group of scanning devices may be connected to a common network and may be configured to discover other scanners on the network. The scanning devices may be configured to communicate the GTIN database and/or changes thereof to each other via the import/export methods and channels described above. Each scanning device may identify other scanners on the network through one or more methods, such as Ethernet methods to discover other devices on an Ethernet network, WiFi methods to discover other devices on a WiFi network, each scanner may include a configured list of all scanners on the network, a discovery protocol may be developed for this need, among other contemplated discovery methods that would be recognized by those skilled in the art.

GTIN_db information may be shared by the scanners by various methods. Non-limiting examples of such sharing may include scanners broadcasting DB changes to all other scanners on the network, scanners importing/exporting information to a common DB that is held on a cloud server, scanners importing/exporting information to a shared server on the network that all scanners use.

The sharing of the GTIN_db data among scanners may be initiated by one or more events. Non-limiting examples of such events may include a change to the GTIN_db by one or more of the scanners on the network, a predetermined number of accumulated changes to the GTIN_db by one or more of the scanners on the network, a periodic time period, detection of a programming label detected by one or more of the scanners on the network, a specific button press or button press sequence by one or more of the scanners on the network, power-up by one or more of the scanners on the network, a reset by one or more of the scanners on the network, etc. In some embodiments, a status on the common DB may indicate the date/time of the last change. Scanners may query the common DB periodically to determine if a new import is needed. An application could broadcast changes to the common DB to all scanners on the network. Other contemplated event triggers for the sharing of the GTIN_db are included within embodiments of the disclosure as would be recognized by those skilled in the art.

In additional embodiments, the decoder may be configured to quickly locate and decode a 2D label when a GS1 1D label is decoded. The decoder may be configured as a decoding algorithm executed by the processor 102 of FIG. 1 on an image captured by the one or more imagers 104. One or more methods described below may be implemented by the processor 102 to quickly decode a 2D label after decoding a 1D label. Such methods may be stand-alone methods or can be used together in combination with each other in some embodiments.

Inside the decoding algorithms, a 1D label may be decoded using 1D localization data. After decoding a 1D label, the decoder may be configured to look near the 1D label for the 2D label and invalidate the 1D label area for 2D localization. The decoding algorithm may provide localization data of the GS1_1D_Label. This data may be used to determine the most likely areas for a 2D label.

Figure 2:
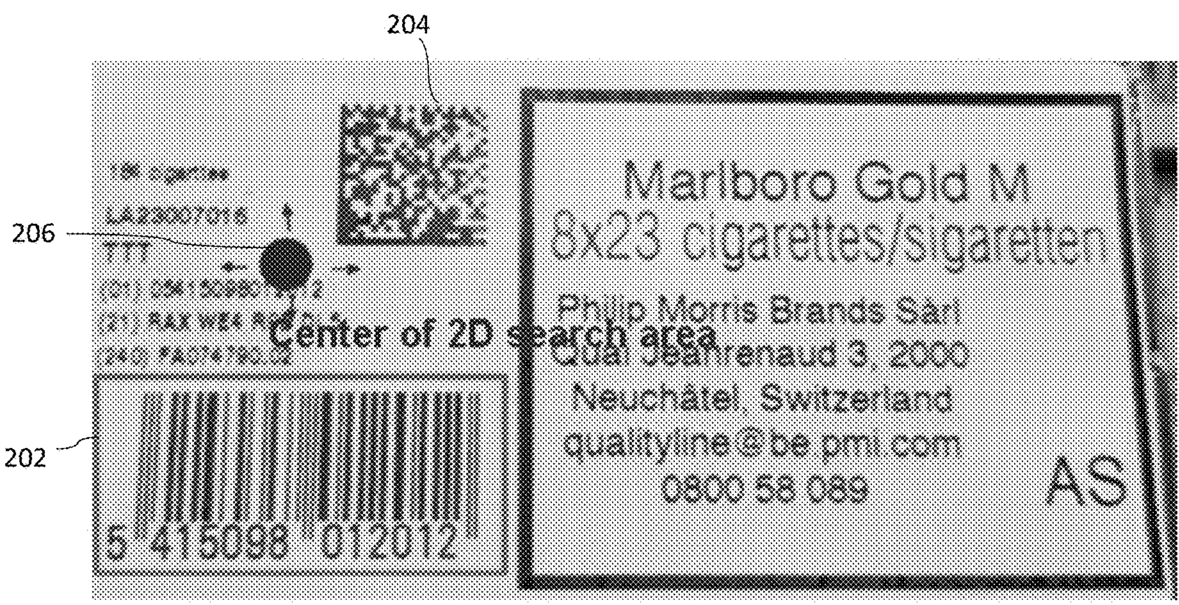
FIG. 2 is an image showing an example of how the geometric position of the 1D decode label drives the later search for the 2D symbology starting from a center of the 2D search area near the label.

FIG. 2 shows an example of how the geometric position of the 1D decode label (indicated by a bounding box 202) may drive the subsequent search for the 2D symbology 204 (e.g., Datamatrix, QR code, etc.). After decoding and locating the 1D label 202, the decoder may then identify a starting point by defining a center of a 2D search area 206 at which point the decoder may start looking for a 2D label to decode. As an additional enhancement, this center of the 2D search area 206 may be determined after invalidating the 1D decode label area 202 and/or other areas of the image unlikely to contain the 2D label 204. As a result, the starting point 206 for locating the 2D label 204 may not be the center of the image as may typically be the default for conventional decoders. The process of locating a 2D label 204 (e.g., Datamatrix) is highly expensive in computational terms, thus making the 2D label search start from an area closer to the 2D label 204 may speed up the whole decoding process.

In another embodiment, 2D label localization algorithms may be used to locate potential 2D label locations based on the position of the 1D label. The decoder may then prioritize the locations near a decoded 1D label to decode the likely 2D label. The method may locate 1D and 2D using localization algorithms. The decoding algorithm may provide location data for decoded 1D labels, and the location data may be used to determine the desired localization points to use from those provided by 2D label localization algorithm.

Figure 3:
FIG. 3 is an image showing the geometric position of the 1D decode label driving the ROIs prioritization.

FIG. 3 shows how the geometric position of the 1D decode label 202 drives the ROIs prioritization for searching for the 2D label. Each 2D ROI search algorithm may have its own ranking order for the detected ROIs that are passed to the decoding library in that priority order. Through this method, that sorts the ROIs based on the distance from the decoded 1D code, the first ROI passed to the decoding algorithm is the one containing the code. These ROIs are shown by bounding boxes in FIG. 3 labeled priority 1, priority 2, priority 3, priority 4. The decoder will first process these portions of the image (in the assigned priority order) in order to attempt to locate and decode the 2D label. Once decoded, the lower remaining priority ROIs may be discarded.

In some embodiments, 2D localization may occur external to the decoding algorithms. Once a 1D label is found, geometric info of 1D decoded label may be used to call the decoding algorithms a second time with sub-region for 2D decoding. The decoding algorithm may provide localization data of the 1D label. This localization data may be used to determine the most likely areas for a 2D label. The most likely areas for a 2D label may be defined by specification or guidelines for a preferred location of a 2D label relative to a 1D label. The decoding algorithm may be directed to consider a sub-region of an image for decoding.

Figure 4:
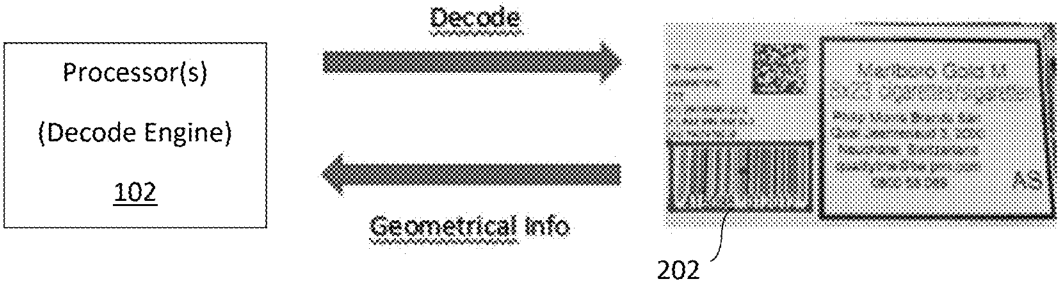
FIG. 4 is an image showing the geometric information of the decoded box of the 1D label illustrating how the decode engine sets a localization sub-region for the 2D label while avoiding analyzing areas without labels.
Figure 4:
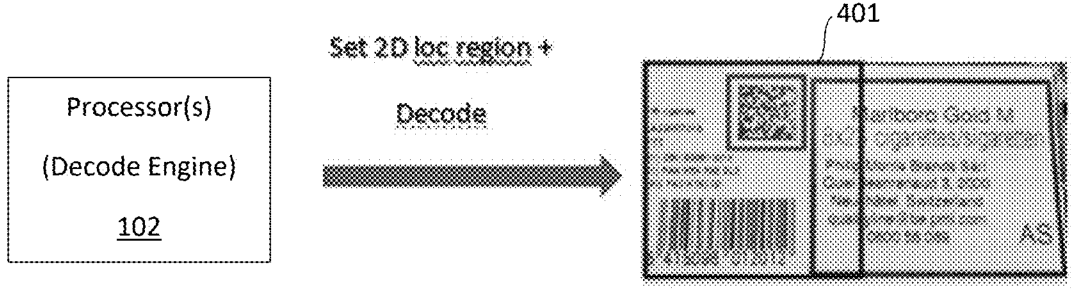

FIG. 4 shows using the geometric information of the decoded box of the 1D label, the decode engine sets a localization sub-region 401 for decoding the 2D label, which may result in avoiding analyzing areas without labels and thus speeding up the decoding process.

Figure 5:
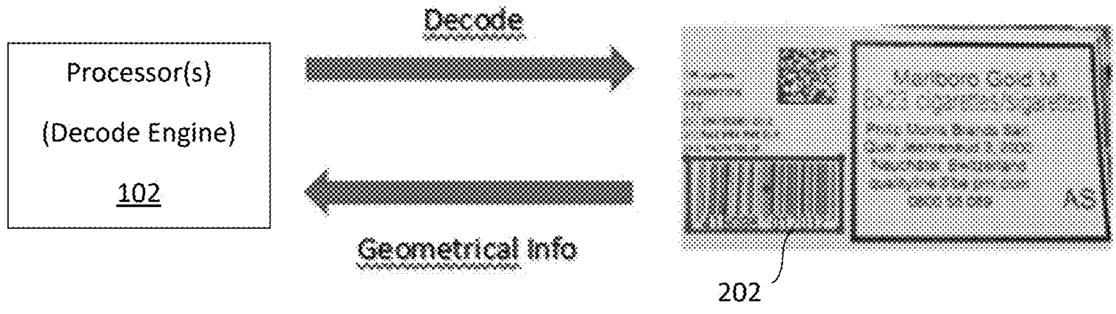
FIG. 5 is an image showing the same data as in FIG. 4 but with the 1D zone prohibited and therefore not analyzed by the 2D label locator.
Figure 5:
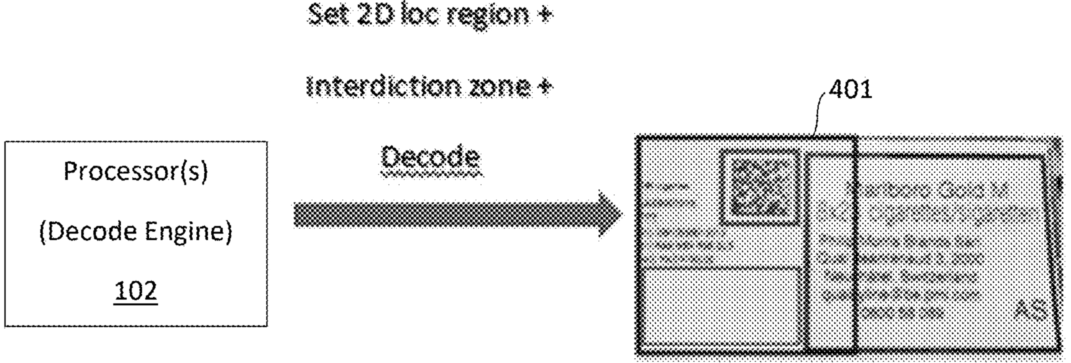

In some embodiments, the sub-region decoding feature of the decoding algorithms may be further enhanced to invalidate a central region for a 1D label that is within or next to an area where a 2D label may be located. The decoding algorithm may be directed to consider a sub-region of an image for decoding. This enhancement may enable the decoding algorithm to decode within a sub-region and also exclude a sub-region within the sub-region. The excluded sub-region is the region of the 1D label. The non-excluded part of the bigger sub-region is the most likely location for the 2D label. FIG. 5 shows the same data as above in FIG. 4 but with the 1D zone prohibited and therefore not analyzed by the 2D label locator and thus speeding up the decoding process even more.

With such decoding methods executed by the processor 102, the 2D label may be decoded and reported to the host more quickly. In addition, the scanner 100 may determine that no 2D label exists more quickly so that the scanner 100 can decrease the wait time for 2D decoding and report a 1D label more quickly when a 2D label does not exist.

The foregoing method descriptions and/or any process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be communicated (e.g., passed, forwarded, and/or transmitted) via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of various preferred embodiments for implementing the disclosure, and the scope of the invention should not necessarily be limited by this description. The scope of the present invention is instead defined by the claims.

What is claimed:

1. A scanning device, comprising:

an imager configured to capture images of items passing through a field of view;

a memory having a local GTIN database stored thereon that associates items that have a joint presence of both a 1D label and a 2D label based on a GTIN of the item or items that do not have joint presence of both a 1D label and a 2D label; and a processor disposed within the housing of the scanning device and operably coupled to the imager and the memory, the processor configured to:

decode a 1D label associated with the item;

query the local GTIN database to determine if a 2D label is expected for the item based on the GTIN derived from decoding the 1D label;

delay reporting the decoded 1D label to a host system and attempting to decode a 2D label responsive to the query of the GTIN database indicating that a 2D label is associated with the item;

report decoding the 1D label immediately to the host system and without attempting to decode a 2D label responsive the query of the GTIN database indicating that a 2D label is not associated with the item; and update the local GTIN database during a learning phase.

2. The scanning device of claim 1, wherein the processor is configured to export at least a portion of the local GTIN database to a remote device.

3. The scanning device of claim 2, wherein the portion of the local GTIN database is the entire local GTIN database.

4. The scanning device of claim 2, wherein the portion of the local GTIN database is a recent change to the local GTIN database.

5. The scanning device of claim 2, wherein the portion of the local GTIN database is an accumulated set of changes made to the local GTIN database since a prior export.

6. The scanning device of claim 2, wherein the remote device is a remote server having a central GTIN database that is updated in response to the portion of the local GTIN database being received from the scanning device.

7. The scanning device of claim 2, wherein the remote device is another scanning device having its own local GTIN database that is updated in response to the portion of the local GTIN database being received from the scanning device.

8. The scanning device of claim 1, wherein the processor is configured to import data from a remote device that is used to update at least a portion of the local GTIN database.

9. The scanning device of claim 8, wherein the remote device is another scanning device connected to the scanning device over a communication channel.

10. The scanning device of claim 1, wherein a time period for the delay is dynamically adjustable responsive to the processor locating a finder pattern for the 2D label to allow for additional time to decode the 2D label.

11. The scanning device of claim 1, wherein the decoding of the 2D label is responsive to a decoder using 1D localization data to start decoding in a region near the 1D label for decoding the 2D label.

12. The scanning device of claim 11, wherein the decoder invalidates an area of the 1D label when decoding the 2D label.

13. The scanning device of claim 1, wherein the decoding of the 2D label prioritizes region of interest (ROI) locations near the 1D label based on 2D label localization algorithms.

14. The scanning device of claim 1, wherein the decoding of the 2D label calls a decoding algorithm another time after decoding the 1D label, wherein the call includes only a sub-region of image for 2D decoding.

15. The scanning device of claim 14, wherein the sub-region of the image specifically excludes a region that includes the 1D label.

16. The scanning device of claim 13, wherein the ROI locations are prioritized for searching for the 2D label during the decoding of the 2D label based on distances of defined ROI locations from a location of the decoded 1D code.

17. The scanning device of claim 16, wherein unprocessed lower priority ROI locations are discarded by the decoder once the 2D label is decoded.

18. The scanning device of claim 1, wherein the processor is configured to update the local GTIN database during the learning phase by tracking relationships between the 1D label and a presence or absence of a 2D label over a predetermined number of decodes of the 1D label before updating the GTIN database.

19. The scanning device of claim 1, wherein the processor is configured to update the local GTIN database during the learning phase by adding a new GTIN entry within its associated joint presence of both a 1D and a 2D label, and discarding a current GTIN entry based on its lack of a recent access in prior queries by the scanner.

20. The scanning device of claim 1, wherein the processor is configured to define a center of a 2D search area for decoding of the 2D label responsive to a decoder using 1D localization data to start decoding the 2D label, wherein the center of the 2D search area is defined after first invalidating an area of the decoded 1D label and/or other areas of the image that are determined to be unlikely to contain the 2D label.

* * * * *